UNITED STATES PATENT OFFICE.

ALFRED MONNIER, OF PHILADELPHIA, PENNSYLVANIA.

IMPROVED PROCESS FOR PURIFYING METALLIC OXIDES.

Specification forming part of Letters Patent No. 46,924, dated March 21, 1865.

*To all whom it may concern:*

Be it known that I, ALFRED MONNIER, of the city of Philadelphia, in the county of Philadelphia and State of Pennsylvania, have invented a new and Improved Process for Purifying Metallic Oxides; and I do hereby declare that the following is a full, clear, and exact description of the same.

My invention is designed to facilitate the process of obtaining pure oxides of iron, copper, cobalt, nickel, and more especially with a view to the obtaining of pure metallic nickel.

Heretofore the purification of the impure oxides was effected by repeated solution and precipitation to obtain them free of sulphate of lime, magnesia, silica, or the precipitant, either alone or mixed together.

The object of my invention is to obtain the pure oxides of those metals in a more economical manner; and for this end I use sulphuric acid, sulphates of potassa or soda, caustic soda or potassa, their carbonates or equivalent. To do this I proceed as follows:

I first remove the sulphate of lime by calcining the hydrated oxides in crucibles or in a reverberatory furnace, then boiling with a solution of caustic potassa or soda, or their carbonates or equivalent, (in a tank with steam heat,) whereby a double decomposition is effected, resulting in the formation of caustic or carbonate of lime and sulphate of potassa or soda. This sulphate of alkali solution being removed by filtration or decantation, a sufficient quantity of diluted acid is added to the former (caustic lime or its carbonate) to dissolve it only, the oxides of the metals proper remaining for the most part intact. The acid which I prefer is hydrochloric.

Secondly. To remove the magnesia, I calcine the oxides (treated as above and free of sulphate of lime) at a red heat in crucibles in a reverberatory furnace with fifty per cent. (more or less) of its weight (according to the quantity of magnesia present) of sulphuric acid or of sulphate of soda or potassa, or equivalent, to which an excess of sulphuric acid is added. I prefer, however, sulphuric acid alone. After subjecting to the proper temperature, the whole is ground in a burr-mill with water and lixiviated with water in a tank heated by a jet of steam to remove the sulphate of magnesia formed. If the oxide of nickel should contain some copper or cobalt, those metals are for the most part extracted as sulphates by adding a little more sulphuric acid and managing carefully the heat. They can then be removed at the same time and along with the sulphate of magnesia.

Thirdly. To remove the silica, I heat the oxides (free of sulphate of lime and magnesia) in crucibles or in a reverberatory furnace with caustic potassa or soda, or carbonates or equivalent. The quantity of the latter necessary will vary with the amount of silica present. About seventy-five per cent. of its weight will be sufficient in most cases. After calcination the mass is to be ground and washed, as has been described, for the removal of magnesia. The oxides are then to be boiled with diluted acid (hydrochloric acid preferred) to remove the last trace of silica, after which they are to be washed and dried. They are then ready for use or may be reduced to the metallic state. The extraction of the magnesia may also be effected (if in small quantity) at the same time with the silica by treating with caustic potassa or soda, or their carbonates or equivalent, and dissolving in acid.

The impure oxide may be treated first with sulphuric acid to remove the magnesia, and afterward with a solution of carbonate of soda to remove the sulphate of lime, or be calcined, with soda to remove the sulphate of lime and silica; but I prefer to treat the oxides in the order first described.

The caustic potassa or soda, or their carbonates or equivalent, employed in the calcination for the extraction of the silica is again used in the state of solution for the decomposition of the sulphate of lime, and the sulphate of soda formed in the said decomposition can be evaporated and used with addition of some sulphuric acid for the extraction of the magnesia.

The advantage of my improved process is that the metallic oxides can be purified without repeated solution and precipitation to free them of impurity, saving time, material, and much labor.

What I claim as my invention, and desire to secure by Letters Patent, is—

The treatment of metallic oxides, for their purification, substantially as herein set forth.

ALFRED MONNIER.

Witnesses:
J. E. SHAW,
GEO. E. BUCKLEY.